US006836662B1

(12) United States Patent
Smith et al.

(10) Patent No.: US 6,836,662 B1
(45) Date of Patent: Dec. 28, 2004

(54) METHOD AND SYSTEM FOR CONNECTING WIRELESS HANDSETS WITH WIRELINE SWITCHES

(75) Inventors: Dennis C. Smith, Longmont, CO (US); James R. Corliss, Thornton, CO (US); Angus O. Doughtery, Westminster, CO (US)

(73) Assignee: Qwest Communications International, Inc., Denver, CO (US)

( * ) Notice: Subject to any disclaimer, the term of this patent is extended or adjusted under 35 U.S.C. 154(b) by 826 days.

(21) Appl. No.: 09/218,247

(22) Filed: Dec. 22, 1998

(51) Int. Cl.[7] ............................................... H04Q 7/20
(52) U.S. Cl. ................................... 455/445; 455/426.1
(58) Field of Search ................................ 455/445, 422, 455/426, 433, 560, 507; 379/242, 219, 220, 221, 258; 370/351, 360

(56) References Cited

U.S. PATENT DOCUMENTS 6,088,597 A * 7/2000 Sato et al. .................. 455/560

* cited by examiner

Primary Examiner—Lee Nguyen
(74) Attorney, Agent, or Firm—Brooks Kushman P.C.

(57) ABSTRACT

A method and system for connecting a wireless handset to a wireline switch in an integrated wireline/wireless telecommunications network having a plurality of access controllers and wireline switches includes a wireless service processor operative to receive identification of a subscriber in response to a call attempt and determine a preferred connection between the wireless handset and one of the plurality of wireline switches based on predetermined data associated with the subscriber. The access controller is operative to connect the wireless handset to one of the plurality of wireline switches based on the preferred connection so as to complete the call attempt.

12 Claims, 3 Drawing Sheets

METHOD AND SYSTEM FOR CONNECTING WIRELESS HANDSETS WITH WIRELINE SWITCHES

TECHNICAL FIELD

This invention relates to methods and systems for connecting wireless handsets with wireline switches.

BACKGROUND ART

In a wireline telecommunications network, telephones are physically connected to a specific wireline switch. Call loading is predicted based on history of voice traffic and number of phones needing connection to a switch. Therefore, a determination as to how big to make a wireline switch or how many switches to provide to serve a given area can easily be made.

As wireless telecommunications networks integrate with wireline networks, excessive call origination loading to any given wireline switch will occur. However, since wireless handsets are mobile, it is difficult to predict where the handset will be when a subscriber attempts to make a call. Thus, there exists a need for a system for connecting the wireless telecommunications network with the wireline telecommunications network by distributing calls over various wireline switches so that the wireline switches will not become overloaded.

DISCLOSURE OF THE INVENTION

It is a general object of the present invention to provide a method and system for connecting a wireless handset with a wireline switch.

It is another object of the present invention to provide a method and system for allocating wireless traffic load across multiple wireline switches so as to not overload any given wireline switch.

It is yet another object of the present invention to provide a method and system for reducing interoffice trunking requirements during call deliveries among the various wireline switches.

In carrying out the above object and other objects, features, and advantages of the present invention, a method is provided for connecting a wireless handset to a wireline switch. The method includes receiving identification of a subscriber in response to a call attempt, determining a preferred connection between the wireless handset and one of the plurality of wireline switches based on predetermined data associated with the subscriber, and connecting the wireless handset to one of the plurality of wireline switches based on the preferred connection so as to complete the call attempt.

In further carrying out the above object and other objects, features, and advantages of the present invention, a system is also provided for carrying out the steps of the above described method. The system includes a wireless service processor operative to receive identification of the subscriber in response to a call attempt and determine a preferred connection between the wireless handset and one of a plurality of wireline switches based on predetermined data associated with the subscriber. The system also includes an access controller for connecting the wireless handset to one of the plurality of wireline switches based on the preferred connection so as to complete the call attempt.

The above object and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
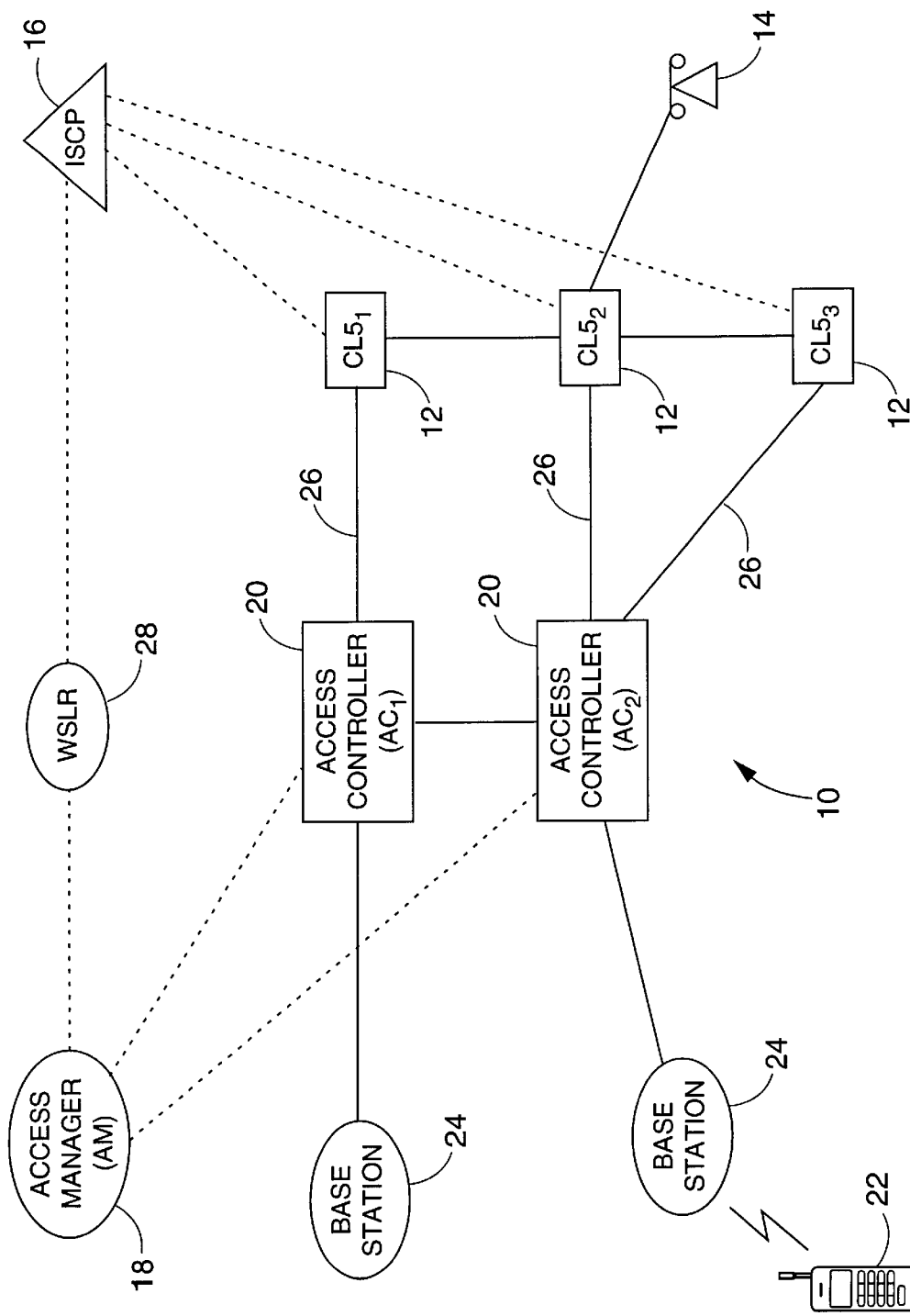
FIG. 1 is a schematic diagram of a wireline telecommunications network integrated with a wireless telecommunications network.

Turning now to FIG. 1, there is shown a schematic diagram of a wireline telecommunications network integrated with a wireless telecommunications network, denoted generally by reference numeral 10. The wireline telecommunications network comprises a plurality of wireline switches 12, such as Class 5 (CL5) switches. These switches 12 are typically owned and operated by the Local Exchange Carrier (LEC) that provides the wireless telecommunications provider with the interconnection to its network. The switches 12 are connected to wireline telephones 14, only one of which is shown in FIG. 1.

Each of the switches 12 have a plurality of physical ports (not shown) that are referred to as interface Directory Numbers (iDNs) since they are essentially telephone numbers (lines) provisioned on the Class 5 switches 12. These lines are grouped into Feature Groups based on the services that are provisioned in the respective switch 12, such as call-waiting, three-way calling, etc.

The switches 12 are also connected among each other via transmission circuits so that interoffice trunking between the switches 12 is possible. Furthermore, the wireline network includes an Intelligent Service Control Point (ISCP) 16 for communicating with the wireless network via Signaling System No. 7 (SS7) signaling, as will be described in greater detail below.

The wireless network includes processors 18, 20 in the form of Access Managers (AMs) and Access Controllers (ACs), respectively. The AM 18 and the AC 20 processors provide all the basic wireless mobility management functionality (i.e., registration, authentication, hand off, etc.) and include the Visitor Location Register (VLR) element (not shown). The functions of the Home Location Register (HLR) (not shown) are contained in the AM 20. AM 18 and AC 20 may be implemented in one platform or may be separate platforms, as shown in FIG. 1. The signaling between AM 18 and AC 20 is vendor specific.

AM 18 and AC 20 communicate with a wireless handset 22 via Base Station (BS) 24. BS 24 typically consists of a transceiver (not shown) and an antenna (not shown) for enabling communications to and from the wireless handset 22. Furthermore, AC 20 is coupled to the wireline network via wireline interfaces 26. Wireline interface 26 is a digital loop carrier system interface which conforms to the TR-NWT-000303 technical requirements for digital loop carrier systems published by Bell Communications Research. Each of the ACs 18 may be coupled to one or more switches via wireline interface 26. In addition, each of the ACs 18 also has a plurality of ports (not shown) that provide access to the multiple switches 12.

Finally, the system of the present invention includes a third processor 28 in the form of a Wireless Service Location Register (WSLR). WSLR 28 is in communication with AM 18 and ISCP 16 in order to provide routing instructions for completing a call connection between wireless handset 22 and one of the wireline switches 12. Rather than have the AM 18 arbitrarily select a circuit to one of the switches 12, WSLR 28 provides specific parameters directing the AM 18 and AC 20 to select a specific switch 12 and port from a specific group of the ports based on predetermined parameters.

The primary objectives achieved by the WSLR 28 include: 1) assigning an originating call to the switch 12 where a subscriber's wireline services are provisioned when that switch 12 is equipped with a wireline interface 26 to an AC 20; 2) reducing the interoffice trunking requirement between switches 12 for call delivery scenarios; and 3) allocating the traffic load across multiple switches 12. Thus, WSLR 28 contains and controls data that enables this capability.

Figure 2:
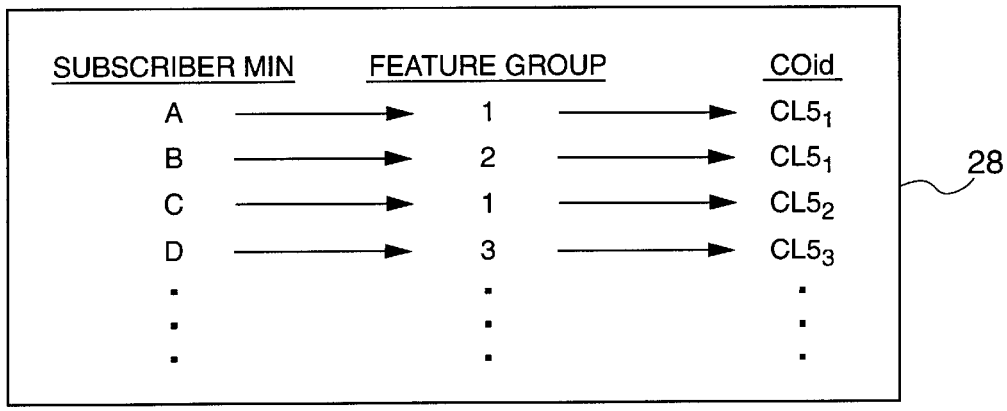
FIG. 2 is a block diagram illustrating the subscriber profile information stored at a Wireless Service Location Register.

WSLR 28 contains profile information for each wireless subscriber and provides instructions to AM 18 concerning a specific wireline switch 12 via a Central Office identification (COid) and a group of possible ports via a Feature Group identification (FGid) for use by the AM 18 (or AC 20) in selecting a specific port for a call. The subscriber profile contained in the WSLR 28 is exemplified in FIG. 2. As shown in FIG. 2, WSLR 28 may contain a table that cross-references a Mobile Identification Number (MIN) associated with the subscriber's wireless handset 22 with the COid of the switch 12 serving the subscriber and the FGid of the features subscribed to by the subscriber. Thus, the WSLR 28 knows which switch 12 serves the subscriber's wireline location (i.e., the subscriber's "home" switch), based on the COid in the profile data, and assigns the call to a Feature Group pool associated with the home switch 12 when possible. Preferably, each Feature Group in each serving switch 12 has common features assigned. That is, Feature Group 1 in all switches 12 will have the same features, e.g., call waiting and call forwarding, regardless of which switch 12 the particular call is assigned. This way the subscriber profile will only need to maintain data as to which Feature Group and home switch 12 the subscriber is associated with.

The WSLR 28 effectively instructs AM 18 to route the call over a specific wireline interface 26 and, as such, to a specific serving switch 12.

Figure 3:
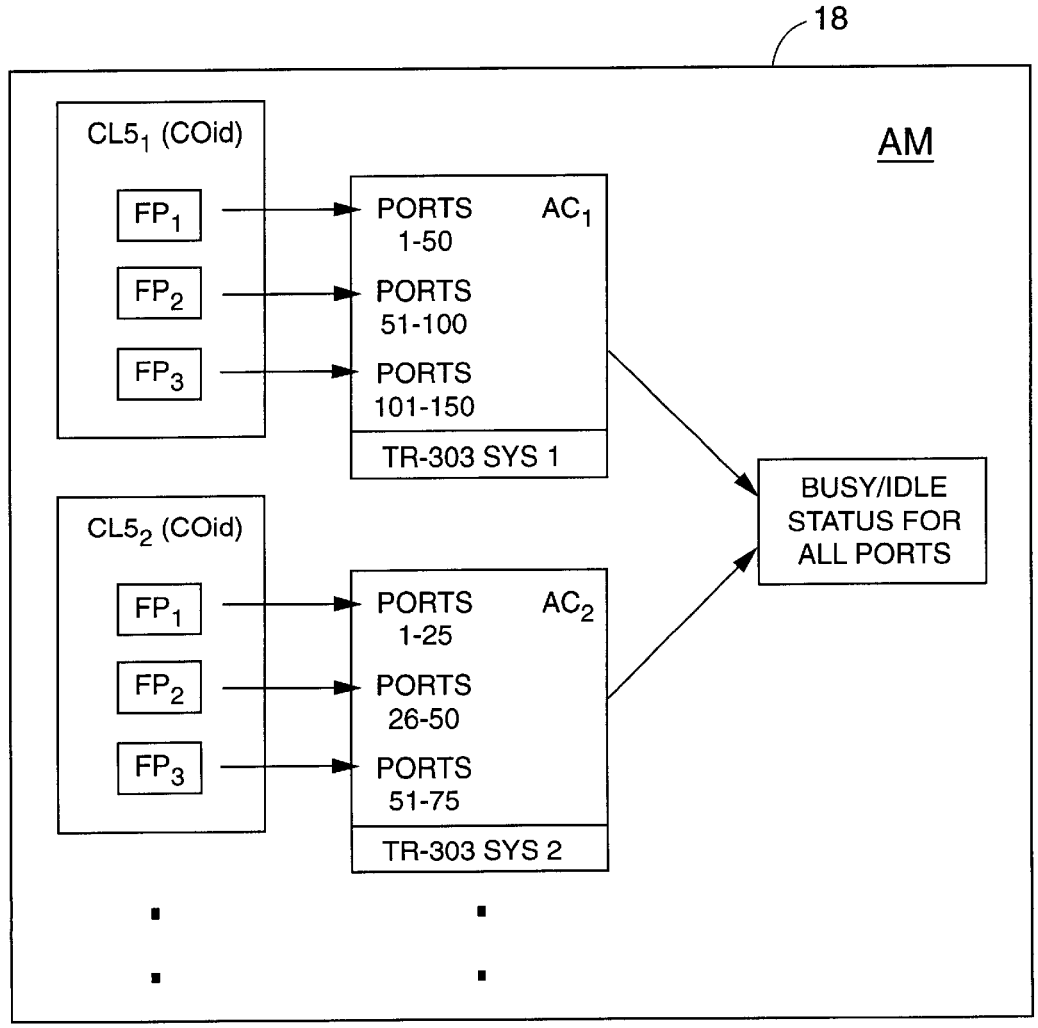
FIG. 3 is a block diagram illustrating the relationship between the wireline switches and Feature Groups as mapped in the Access Controller.

However, the AM 18 is responsible for selecting an idle port that satisfies these conditions. In accomplishing this, AM 18 maintains the real time Busy/Idle status of the ports with a Feature Group on a call-by-call basis, as shown in FIG. 3. The application in the AM 18 contains a mapping of individual switches 12 and Feature Groups to actual ports in the AC 20 along with the immediate Busy/Idle status of all the ports associated with the particular AC 20. However, the actual implementation does not require the port assignments to be sequential as shown in FIG. 3. The AM 18, thus, selects an idle port from the group of ports that satisfies the request/instruction from WSLR 28.

Figure 4:
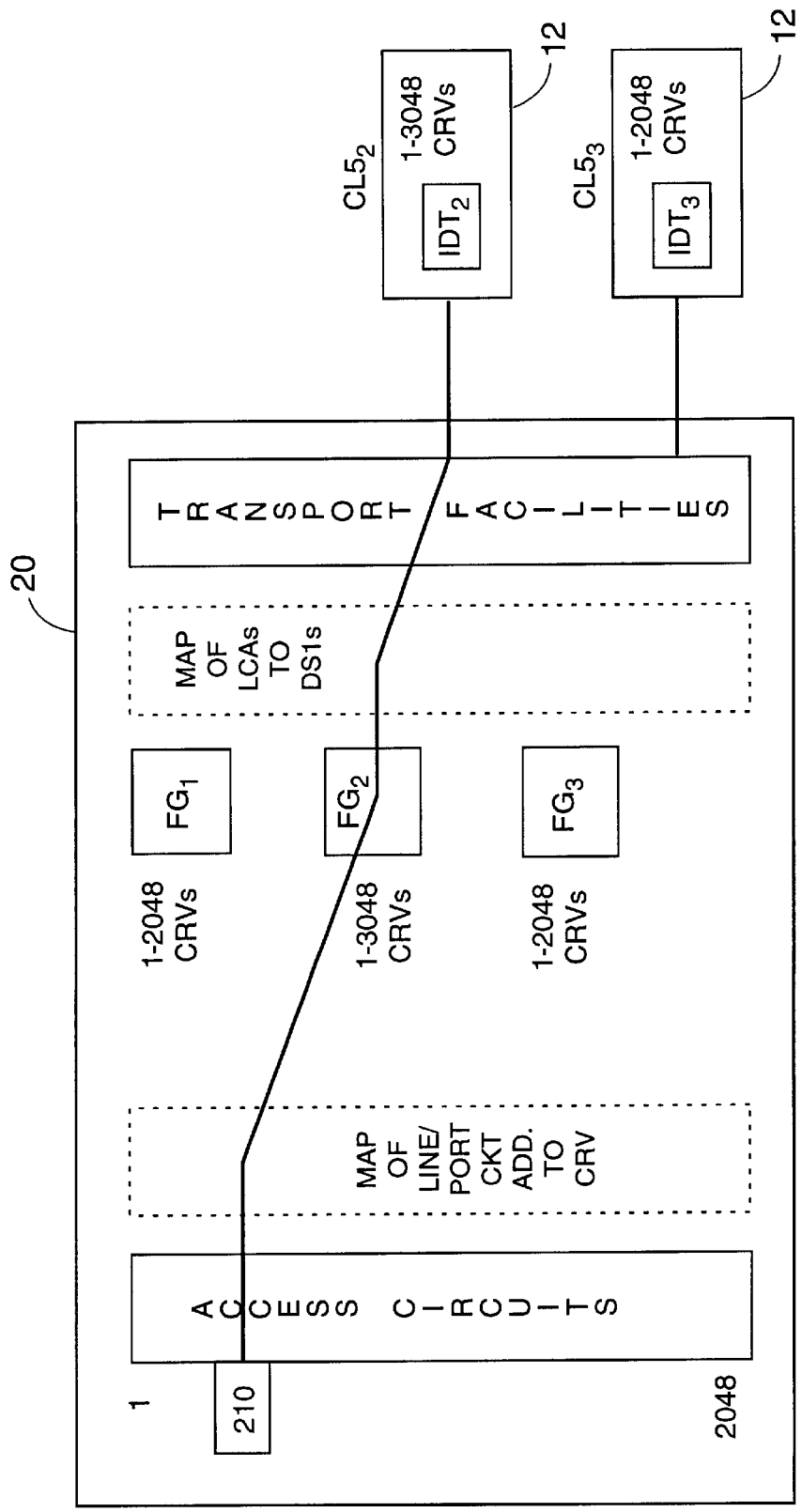
FIG. 4 is a block diagram illustrating the mapping relationship between the physical ports and the Feature Group ports in any given Access Controller.

The mapping of the port addresses to an appropriate Call Reference Value (CRV) of the associated Feature Group and the mapping of the port addresses to the appropriate DS1 is provisioned at the discretion of the service provider. FIG. 4 illustrates a view of how the physical port appearances are mapped to the appropriate CRV and the appropriate DS1 in order to appear as a call with the correct features on the correct Serving Class 5 switch 12. Thus, FIG. 4 is illustrative of the subscriber being subscribed to Feature Group 2 and for the current call is assigned to physical port #210 associated with serving Class 5 switch #2.

The CRV is an internal identifier used within a typical TR-303 implementation and the corresponding wireline switch 12 to identify the number of the port being used for a particular call. For example, in FIG. 4 port #210 is "cross-connected" to a CRV. Whenever a call is connected to port #210 the switch 12 will use the CRV as a way of identifying all the messages that go across the wireline interface 26 relevant to this port. In the WSLR 28 or the AM 18, the port is identified by a regular telephone number. A DS1 is a digital facility consisting of 24 DSOs (64 kbps) voice channels.

In a call delivery scenario, i.e., a call to the wireless handset 22, incoming calls to the subscriber's handset 22 will be assigned a port that resides on the subscriber's wireline, or home, switch 12 if possible so as to avoid an interoffice trunk connection to another switch 12. For example, if the subscriber's home switch 12 is $CL5_2$, as shown in FIG. 1, and the WSLR 28 assigns a call to a Feature Group on either $CL5_1$ or $CL5_3$, an interoffice trunk connection between either $CL5_1$ or $CL5_3$ and $CL5_2$ will be required to deliver the call to the AC 20 serving the wireless handset 22. If, however, the home switch 12 does not connect to the AC 20 serving the wireless handset 22, then an interoffice connection cannot be avoided. In this case, the WSLR 28 assigns the call to a switch 12 based on other predetermined data, such as time of day, day of week, predetermined traffic loads, etc. As such, the application in the WSLR 28 is required to maintain in its data a log of the number of active calls (identified by MINs) assigned to any given switch 12 associated with the ACs 20 in its universe. The identification of the switch 12 (i.e., COid) which as assigned the call is returned to the WSLR 28 from the AM 18 and is updated when the call is released and a call released message is sent by the AM 18 to the WSLR 28.

In order to initiate operation of WSLR 28, the switch 12 receiving the incoming call performs a digit analysis and determines it must query the ISCP 16. This is done by setting a "trigger" in the switch 12, in software and applications, that instructs the switch 12 to go to the ISCP 16 for instructions when someone attempts to terminate a call to a particular number. The ISCP 16 in turn queries the WSLR 28 to request a port assignment. The WSLR 28 assigns the call to the home switch 12, if possible, and a Feature Group associated with the home switch 12 based on the subscriber's profile (or MIN of the number dialed) as shown in FIG. 2.

This assignment is sent to AM 18, which then assigns a specific port from the Feature Group for the call based on the Busy/Idle status of each of the ports in the Feature Group. AM 18 then returns this information to the WSLR 28, which in turn transfers this information to ISCP 16 for instructing the switch 12 which IDN port to route the call. The switch 12 then sends the call to the AC 20 which has been instructed by AM 18 as to which wireless handset 22 the call is to be delivered to.

If the AC 20 cannot satisfy the WSLR request for a primary route (i.e., access associated with a Feature Group to the selected switch 12 is unavailable), the WSLR 28 will designate an alternate route multiple times. In a preferred embodiment, eight retries shall be performed, either by eight WSLR-AC retries, or by the WSLR 28 including the eight possible route options in a single response message. The preferred embodiment is for the WSLR 28 to provide a series of values to the AM 18. It will then be the responsibility of the service provider's traffic engineering group to determine the desired priority switch 12 to be identified in the message parameter when requesting a port assignment by the AM/AC and provision that data in the subscriber's profile to be utilized by the port management applications in the WSLR 28.

A call origination scenario is processed in a manner similar to that of the call delivery scenario. The handset 22 signals the AM 18 that a call is being made, i.e., the subscriber's digits are sent. The AM 18 queries the WSLR 28 for instructions as to which Feature Group and switch 12 to select. Upon receiving this information, AM 18 instructs AC 20 to provide a voice channel to the handset 22 and connect the resulting call to a port, from the available corresponding Feature Group ports, to a switch 12 connected to the AC 20. Thus, a call can be originated from any Class 5 switch 12 connected to the serving AC 20 since an originating call does not require functionality in the home switch. If, however, the subscriber has integrated service, i.e., both wireline and wireless service using a single number, there can be some advantages for routing the call to the home switch 12 for origination. However, any switch 12 is suitable in order to balance traffic loads or obtain appropriate features.

While embodiments of the invention have been illustrated and described, it is not intended that these embodiments illustrate and describe all possible forms of the invention. Rather, it is intended that the following claims cover all modifications and alternative designs, and all equivalents, that fall within the spirit and scope of this invention.

What is claimed is:

1. A method for connecting a wireless handset to a wireline switch in an integrated wireline/wireless telecommunications network having a plurality of access controllers and wireline switches, each of the access controllers being coupled to at least one of the wireline switches, the method comprising:
   receiving identification of a subscriber in response to a call attempt;
   determining a preferred connection between the wireless handset and one of the plurality of wireline switches based on predetermined data associated with the subscriber; and
   connecting the wireless handset to one of the plurality of wireline switches based on the preferred connection so as to complete the call attempt.

2. The method as recited in claim 1 wherein each of the access controllers includes a plurality of physical ports for terminating connections between the access controller and associated wireline switches and wherein determining the preferred connection includes determining a preferred wireline switch from the plurality of wireline switches and a connection port from the plurality of physical ports based on the predetermined data.

3. The method as recited in claim 2 wherein determining the preferred wireline switch comprises:
   receiving the identification of the subscriber from one of the wireline switches in response to a call delivery attempt to the wireless handset; and
   determining a home wireline switch associated with the wireless handset from the plurality of wireline switches based on the predetermined data.

4. The method as recited in claim 2 wherein determining the preferred wireline switch comprises:
   receiving the identification of the subscriber from one of the access controllers in response to a call origination attempt by the wireless handset; and
   determining at least one wireline switch from a subset of the plurality of wireline switches based on predetermined communications traffic data, the subset corresponding to the wireline switches actually coupled to the one of the access controllers.

5. The method as recited in claim 2 wherein determining the connection port includes determining a plurality of preferred ports from the plurality of physical ports based on the predetermined data, the plurality of preferred ports being a subset of the plurality of physical ports and having common line-side features associated therewith.

6. The method as recited in claim 5 wherein each of the physical ports have one of a busy status and an idle status and wherein determining the connection port from the plurality of preferred ports includes determining the status of each of the plurality of preferred ports.

7. A system for connecting a wireless handset to a wireline switch in an integrated wireline/wireless telecommunications network having a plurality of access controllers and wireline switches, each of the access controllers being coupled to at least one of the wireline switches, the system comprising:
   a wireless service processor operative to receive identification of a subscriber in response to a call attempt and determine a preferred connection between the wireless handset and one of the plurality of wireline switches based on predetermined data associated with the subscriber; and
   the access controller for connecting the wireless handset to one of the plurality of wireline switches based on the preferred connection so as to complete the call attempt.

8. The system as recited in claim 7 wherein each of the access controllers includes a plurality of physical ports for terminating connections between the access controller and associated wireline switches and wherein the wireless service processor, in determining the preferred connection, is further operative to determine a preferred wireline switch from the plurality of wireline switches and a connection port from the plurality of physical ports based on the predetermined data.

9. The system as recited in claim 8 wherein the wireless service processor, in determining the preferred wireline switch, is further operative to receive the identification of the subscriber from one of the wireline switches in response to a call delivery attempt to the wireless handset and determine a home wireline switch associated with the wireless handset from the plurality of wireline switches based on the predetermined data.

10. The system as recited in claim 8 wherein the wireless service processor, in determining the preferred wireline switch, is further operative to receive the identification of the subscriber from one of the access controllers in response to a call origination attempt by the wireless handset and determine at least one wireline switch from a subset of the plurality of wireline switches based on predetermined communications traffic data, the subset corresponding to the wireline switches actually coupled to the one of the access controllers.

11. The system as recited in claim 8 wherein the wireless service processor, in determining the connection port, is further operative to determine a plurality of preferred ports from the plurality of physical ports based on the predetermined data, the plurality of preferred ports being a subset of the plurality of physical ports and having common line-side features associated therewith.

12. The system as recited in claim 11 wherein each of the physical ports have one of a busy status and an idle status and wherein the access controller, in connecting the wireless handset to one of the plurality of wireline switches, is further operative to determine the status of each of the plurality of preferred ports.

* * * * *